United States Patent [19]
Nagai

[11] Patent Number: 5,419,293
[45] Date of Patent: May 30, 1995

[54] FAIL-SAFE SYSTEM OF AN AUTOMATIC DRIVING SYSTEM FOR A MOTOR VEHICLE

[75] Inventor: Masaaki Nagai, Gunma, Japan

[73] Assignee: Fuji Jukogyo Kabushiki Kaisha, Tokyo, Japan

[21] Appl. No.: 184,596

[22] Filed: Jan. 21, 1994

[30] Foreign Application Priority Data

Feb. 4, 1993 [JP] Japan .................. 5-040398
Feb. 4, 1993 [JP] Japan .................. 5-040399

[51] Int. Cl.⁶ .................. F02D 9/08; B60K 41/20
[52] U.S. Cl. .................. 123/336; 123/396; 123/399; 180/197
[58] Field of Search .............. 123/336, 396, 399, 400; 180/197; 364/426.02, 431.04

[56] References Cited

U.S. PATENT DOCUMENTS

| | | | |
|---|---|---|---|
| 4,872,435 | 10/1989 | Ueyama et al. | 123/336 |
| 4,892,071 | 1/1990 | Asayama | 123/336 |
| 4,895,343 | 1/1990 | Sato | 123/396 X |
| 5,035,213 | 7/1991 | Pfalzgraf et al. | 123/336 |
| 5,036,816 | 8/1991 | Mann | 123/336 |
| 5,105,360 | 4/1992 | Akiyama | 123/336 X |
| 5,124,922 | 6/1992 | Akiyama | 123/336 X |
| 5,151,861 | 9/1992 | Danno et al. | 123/336 X |
| 5,297,521 | 3/1994 | Sasaki et al. | 123/396 |

*Primary Examiner*—Willis R. Wolfe
*Attorney, Agent, or Firm*—Martin A. Farber

[57] ABSTRACT

An automatic driving system for a motor vehicle has a main actuator for operating a main throttle valve, an auxiliary actuator for operating an auxiliary throttle valve, and sensors for detecting driving conditions of a present motor vehicle and for producing driving condition signals. A failure of the automatic driving system is determined based on the driving condition signals. In response to the determined failure, the main and auxiliary actuators are operated so as to close the main and auxiliary throttle valves.

5 Claims, 5 Drawing Sheets

FAIL-SAFE SYSTEM OF AN AUTOMATIC DRIVING SYSTEM FOR A MOTOR VEHICLE

BACKGROUND OF THE INVENTION

The present invention relates to a fail-safe system for an automatic car driving system wherein a throttle valve is automatically controlled, and more particularly to a system for preventing troubles caused by failures in the automatic driving system.

In an example of the automatic driving system, a plurality of cameras are mounted on the vehicle to monitor forward conditions such as a behavior of a front-running vehicle (a vehicle which is running in front). A control unit processes image data picked up by the camera to determine acceleration and deceleration of the front-running vehicle, and drives a motor to operate a main throttle valve of the present vehicle dependent on the acceleration and deceleration of the front-running vehicle. An auxiliary throttle valve is further provided adjacent the main throttle valve to control traction of the vehicle.

In such a tandem throttle device, the auxiliary throttle valve is widely open when the vehicle is driven without slipping. If the motor for operating the main throttle valve or a throttle position sensor fails during the automatic driving, the main throttle valve may be maintained to be opened at a large degree. With the both valves widely open, the vehicle speed undesirably increases. Thus it is necessary to provide a fail-safe system which renders the automatic driving system inoperative when a device thereof fails. It is further necessary to allow the engine to be properly operated through other auxiliary means when the automatic driving system does not work.

Japanese Patent Application Laid-Open 2-271034 discloses a fail-safe system for the tandem throttle device. The main throttle valve is electronically controlled by a motor and the auxiliary throttle valve is operated in accordance with the operation of an accelerator pedal. When the motor for the main throttle valve fails, the auxiliary throttle valve is operated to control the power of the engine. However, the fail-safe system is not for the automatic driving system. Moreover, the system cannot detect the failure of devices such as the motor and a throttle position sensor, and errors caused by displacement of the sensor from a set position.

Japanese Patent Application Laid-Open 63-314330 discloses a fail-safe system having an auxiliary throttle valve urged in the closing direction by a spring which is operated by a solenoid. When the main throttle valve fails, the auxiliary valve is closed by the spring. Neither of the conventional system is a fail-safe system for the automatic driving system. Since the auxiliary valve is closed at the failure, the driver cannot drive the vehicle by operating the accelerator pedal.

SUMMARY OF THE INVENTION

An object of the present invention is to provide a fail-safe system of an automatic driving system where the automatic driving system is rendered inoperative at a failure of a device thereof, and capable of manually driving a vehicle.

According to the present invention, there is provided the fail-safe system of the automatic driving system for a motor vehicle having, a main actuator for operating a main throttle valve, an auxiliary actuator for operating an auxiliary throttle valve, a camera for detecting running conditions of a front-running vehicle and for generating a running condition signal, sensors for detecting driving conditions of a present motor vehicle and for producing driving condition signals, an automatic drive select switch for producing an automatic drive signal when operated, first control means responsive to the automatic drive signal and driving condition signals for operating the main actuator, and second control means responsive to the automatic drive signal and driving condition signals for operating the auxiliary actuator.

The fail-safe system comprises determining means responsive to the automatic drive signal and the driving condition signals for determining a failure of the automatic driving system and for producing a failure signal, actuator control means responsive to the failure signal for operating the main and auxiliary actuators so as to close the main and auxiliary throttle valves.

Other objects and features of the present invention will become understood from the following description with reference to the accompanying drawings.

DETAILED DESCRIPTION OF THE PREFERRED EMBODIMENTS

Figure 1:
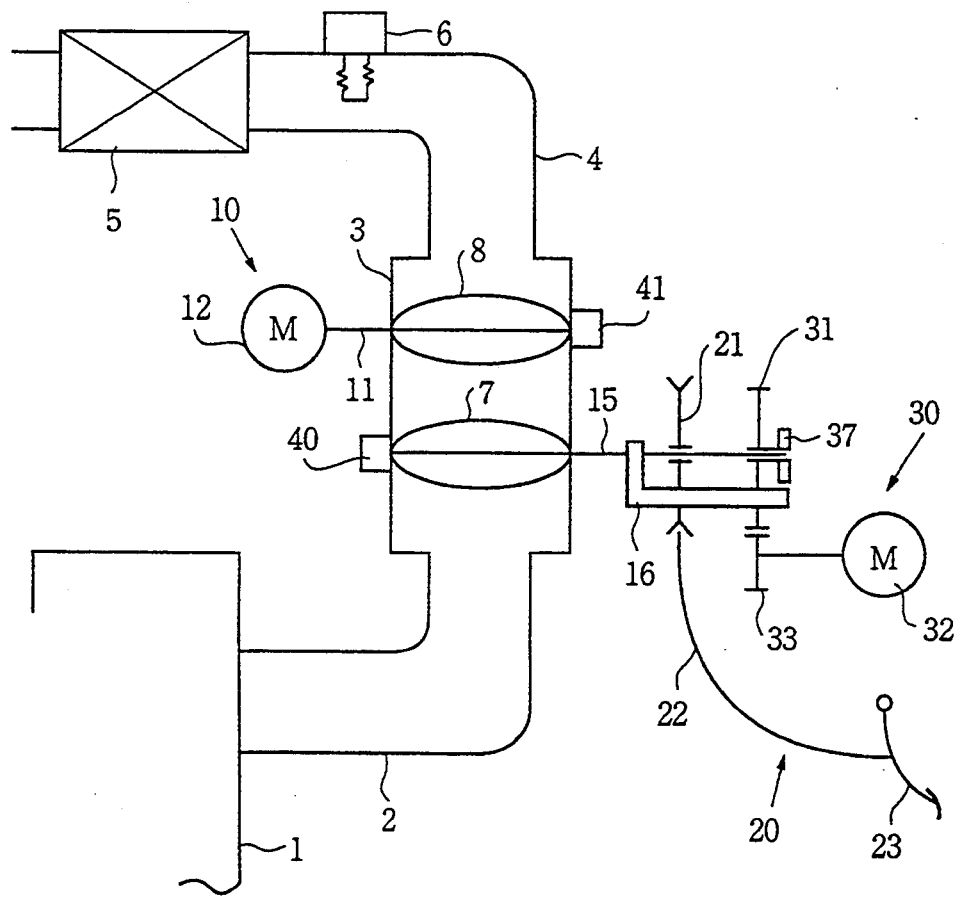
FIG. 1 shows a schematic diagram of a throttle valve and a control device thereof.

Referring to FIG. 1, an engine 1 of a motor vehicle is supplied with air through an air cleaner 5, intake pipe 4, a throttle body 3 having an auxiliary throttle valve 8 and a main throttle valve 7, and an intake manifold 2. The auxiliary throttle valve 8 is provided immediately upstream of the main valve 7 for controlling traction of the vehicle. The valve 8 is mounted on a valve shaft 11, normally at a position to be widely open and operated by a traction controller 10. The controller 10 has a motor 12 operatively connected to the valve shaft 11 for closing the valve 8.

An auxiliary throttle position sensor 41 is further provided adjacent the valve shaft 11. When a driving wheel of the vehicle slip, a traction control system is operated to drive the motor 12, thereby closing the throttle valve 8.

The main throttle valve 7 is mounted on a valve shaft 15 on which is fixedly mounted an L-shaped select lever 16. The select lever 16 is adapted to be connected either to an accelerator pedal operating device 20 or an automatic control device 30. A main throttle position sensor 40 is further provided adjacent the valve shaft 15.

Figure 2:
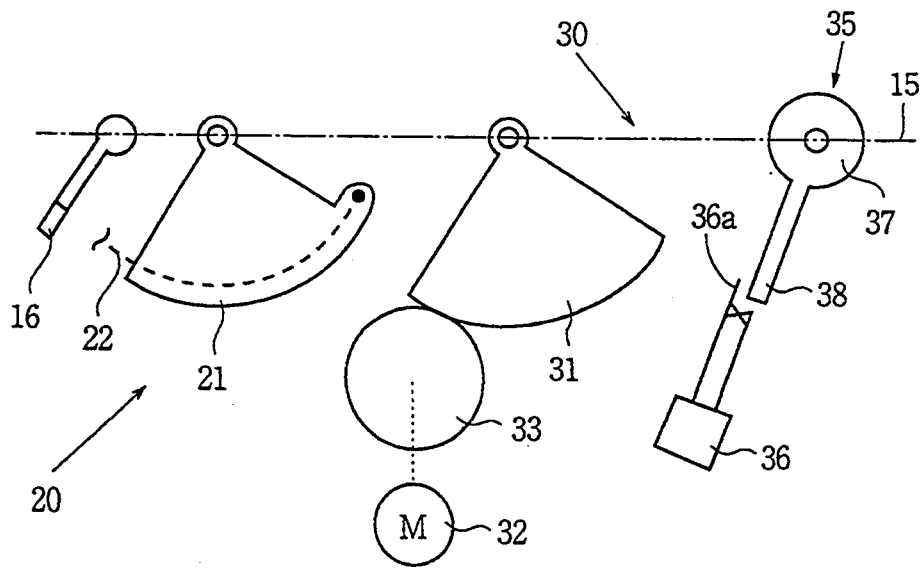
FIG. 2 shows an exploded view of the control device.

Referring to FIG. 2, the accelerator pedal operating device 20 has a sector-shaped accelerator cam 21 rotatably mounted on the shaft 15. The cam 21 is operatively connected to an accelerator pedal 23 through a cable 22.

When the accelerator pedal 23 is depressed, the cam 21 engages the select lever 16 so as to rotate the valve shaft 15. Hence the throttle valve 7 is operated.

The select lever 16 is further adapted to be engaged with a sector-shaped throttle gear 31 of the automatic control device 30. The throttle gear 31 is securely mounted on a hub of an electromagnetic clutch 37 mounted on the valve shaft 15. The throttle gear 31 engages with a pinion 33 which is driven by a motor 32.

Adjacent the electromagnetic clutch 37 is disposed a normally closed limit switch 36. The electromagnetic clutch 37 has an operation lever 38 so as to be engaged with a movable contact 36a of the limit switch 36, thereby forming a limit mechanism 35. When the electromagnetic clutch 37 is energized, the operation lever 38 of the limit mechanism 35 is operatively connected to the throttle gear 31. When the motor 32 is driven, the throttle gear 31 engages with the select lever 16, thereby rotating the valve shaft 15 and hence operating the throttle valve 7. When the throttle gear 31 is rotated a predetermined degree, the operation lever 38 engages the movable contact 36a of the limit switch 36 to turn off the limit switch 36. Thus, the motor 32 is stopped.

Figure 3:
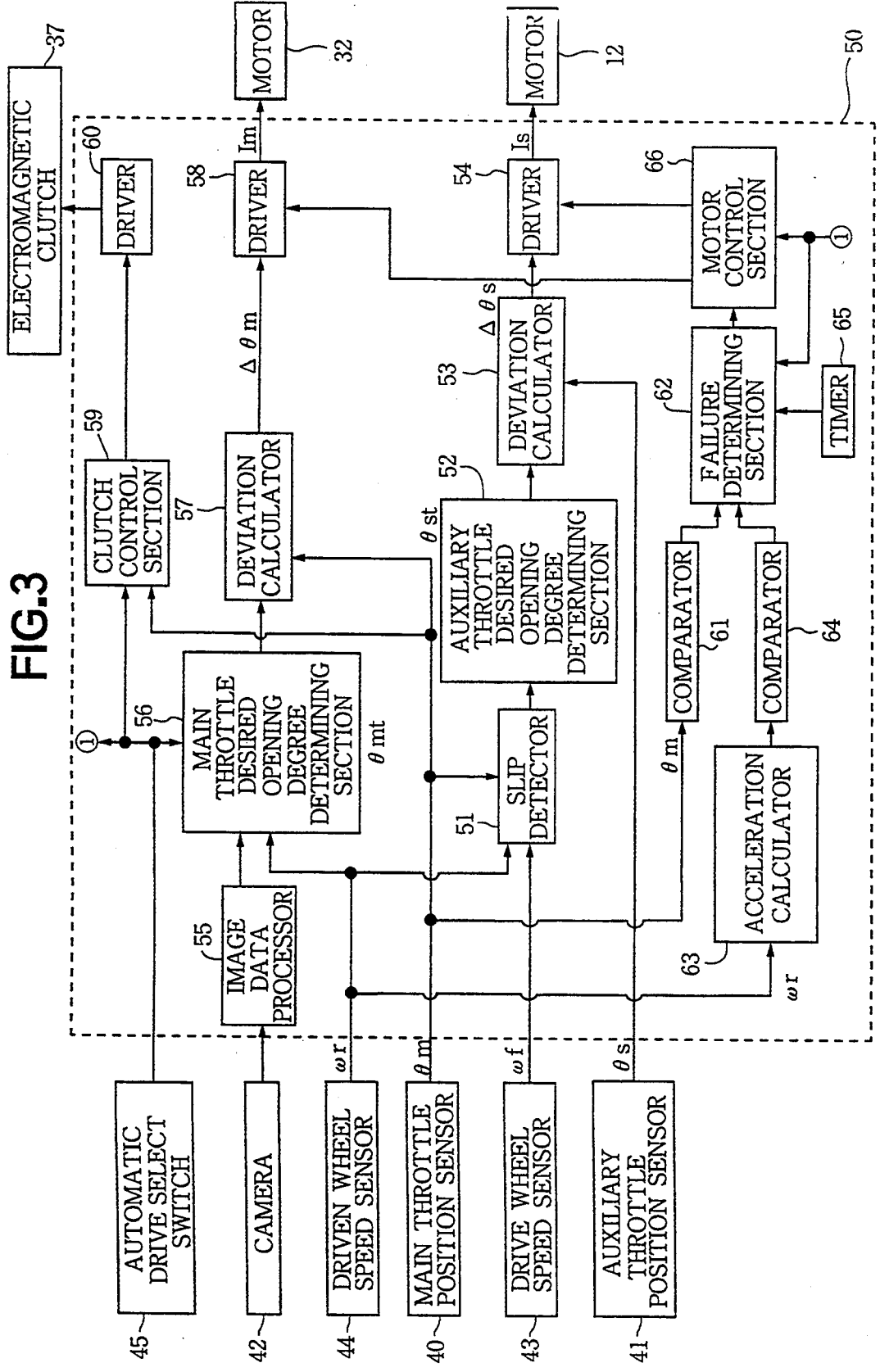
FIG. 3 shows a block diagram of a control unit of the control device.

FIG. 3 shows a control unit 50 for controlling the automatic control device 30 and the traction controller 10. The control unit 50 has an image data processor 55 to which a signal from a camera 42 mounted on the vehicle is applied. The image data processor 55 detects the distance between the front-running vehicle and the present vehicle, relative speed, and conditions of the road. Signals representing these detected driving conditions are fed to a main throttle desired opening degree determining section 56 which is further applied with an ON signal from an automatic drive select switch 45 and a driven wheel speed $\omega r$ from a driven wheel speed sensor 44. The desired magnitude of longitudinal acceleration determining section 56 determines whether to accelerate or decelerate the vehicle in accordance with the distance between the front-running vehicle and the present vehicle and further determines a corresponding desired throttle opening degree $\theta mt$.

The main throttle desired opening degree $\theta mt$ is applied to a deviation calculator 57 which calculates a deviation $\Delta\theta m$ between the main throttle desired opening degree $\theta mt$ and a main throttle actual opening degree $\theta m$ detected by the main throttle position sensor 40 provided adjacent the throttle shaft 15. The deviation $\Delta\theta m$ is fed to a driver 58 which in turn applies an electric current Im corresponding to the deviation $\Delta\theta m$ to the motor 32 to drive it.

The control unit 50 further has a clutch control section 59 which is applied with the output signal of the automatic drive select switch 45 and the actual main throttle opening degree $\theta m$. When the automatic drive select switch 45 is turned on, the clutch control section 59 determines an upper limit $\theta max$ of the throttle opening degree. When the opening degree $\theta m$ of the throttle valve operated by the motor 32 reaches the upper limit $\theta max$, a current is applied to the electromagnetic clutch 37 through a driver 60. Hence the clutch 37 is energized to couple the throttle gear 31 and the operation lever 38.

The control unit 50 is further provided with a traction control system having a slip detector 51 which is applied with the driven wheel speed $\omega r$, drive wheel speed $\omega f$ detected by a drive wheel speed sensor 43, and the main throttle opening degree $\theta m$ from the main throttle position sensor 40. The slip detector 51 compares the wheel speeds $\omega r$ with the wheel speed $\omega f$ to detect the slip of the wheels when the accelerator pedal is depressed for starting or accelerating the vehicle.

When the wheels slip, a slip signal is fed to an auxiliary throttle desired opening determining section 52 wherein a desired opening degree $\theta st$ of the auxiliary throttle valve 8 is set in accordance with the slipping quantity to operate the valve in the closing direction. The desired opening degree $\theta st$ and an auxiliary throttle actual opening degree $\theta s$ detected by the auxiliary throttle position sensor 41 are fed to a deviation calculator 53 to calculate a deviation $\Delta\theta s$ therebetween. A closing signal corresponding to the deviation $\Delta\theta s$ is fed to a driver 54 which applies a current Is to the motor 12.

A fail-safe system is described hereinafter. The main throttle opening degree $\theta m$ is fed to a comparator 61 to be compared with a predetermined reference degree $\theta 1$. When the opening degree $\theta m$ is larger than the reference degree $\theta$, a failure determining section 62 counts a time t by a timer 65. When the time t exceeds a predetermined reference time t1 while the automatic drive select switch 45 is turned on, the failure determining section 62 determines that there is a failure in the automatic driving system.

The driven wheel speed $\omega r$ is fed to an acceleration calculator 63 wherein a magnitude $\alpha$ of acceleration is calculated. The magnitude $\alpha$ is compared with a predetermined reference magnitude $\alpha_2$ at a comparator 64. When the magnitude $\alpha$ of acceleration is larger than the reference value $\alpha_2$ for more than a predetermined period of time t2, that is the vehicle is excessively accelerated, the failure determining section 62 determines a failure. Namely, in the present invention, the failure in the automatic driving system is detected either from the condition of the main throttle valve 2, or the magnitude of acceleration of the vehicle.

A failure signal is fed from the failure determining section 62 to a motor control section 66 which in turn applies a current cut off signal to the driver 58 and a closing signal to the driver 54 to close both of the main throttle valve 7 and the auxiliary throttle valve 8. When an OFF signal is fed to the motor control section 66 from the automatic drive select switch 45, that is when the manual driving is resumed, the closing signal fed to the driver 54 is revoked, thereby opening the auxiliary throttle valve 8.

The operation of the present invention is described hereinafter. During the manual driving, where the automatic drive select switch 45 is turned off, when the accelerator pedal 23 is depressed, the accelerator cam 21 is rotated through the cable 22 to engage the select lever 16. As the accelerator pedal is progressively depressed, the select lever 16 is rotated by the cam 21, thereby rotating the valve shaft 15 and hence opening the throttle valve 7. Consequently, an air-fuel mixture in quantity corresponding to the opening degree of the throttle valve 7 is introduced into the engine 1, thereby producing engine power to drive the vehicle.

At the start or the acceleration of the vehicle, the slip detector 51 of the control unit 50 detects the slipping of the wheel in accordance with the drive wheel speed $\omega f$ and driven wheel speed $\omega r$. While the driving wheel grips the road, auxiliary throttle valve 8 is maintained at the wide open state. When the driving wheels slip, such as at acceleration on a road having a low friction coefficient, the motor 12 of the traction controller 10 is driven to close the auxiliary throttle valve 8 dependent on the desired auxiliary throttle opening degree $\theta st$. Thus, the quantity of intake air is reduced to decrease the engine power. As a result, the wheel grips the road, resulting in a stable driving.

When the driver turns on the automatic drive select switch 45 while the vehicle is driven at a certain speed, and releases the accelerator pedal 23, the automatic control device 30 is operated. Namely, the image data, the drive and driven wheel speeds ωf and ωr, the main throttle opening degree am and the auxiliary throttle opening degree θs are detected by the camera 42, the wheel speed sensors 43 and 44, the main throttle position sensor 40 and the auxiliary throttle position sensor 41, respectively, and are fed to the control unit 50. The desired throttle opening degree θmt is determined in accordance with the distance between the front-running vehicle and the present vehicle, and the vehicle speed. When the desired opening degree θmt increases, the motor 32 is driven to increase the opening degree of the throttle valve 7 so that the vehicle is accelerated. On the other hand, when the desired opening degree θmt is decreased, the throttle valve 7 is operated in the closing direction to decelerate the vehicle.

If the opening degree θm of the throttle valve reaches the upper limit θmax, the operating lever 38 of the electromagnetic clutch 37 engages with the movable contact 36a of the limit switch 36, thereby to turn off the switch 36. The motor 32 is accordingly turned off, so that the throttle valve 7 is prevented from further opening. When the driving wheel slips, the auxiliary throttle valve 8 is operated in the same manner as at the manual driving to improve the traction.

Figure 4:
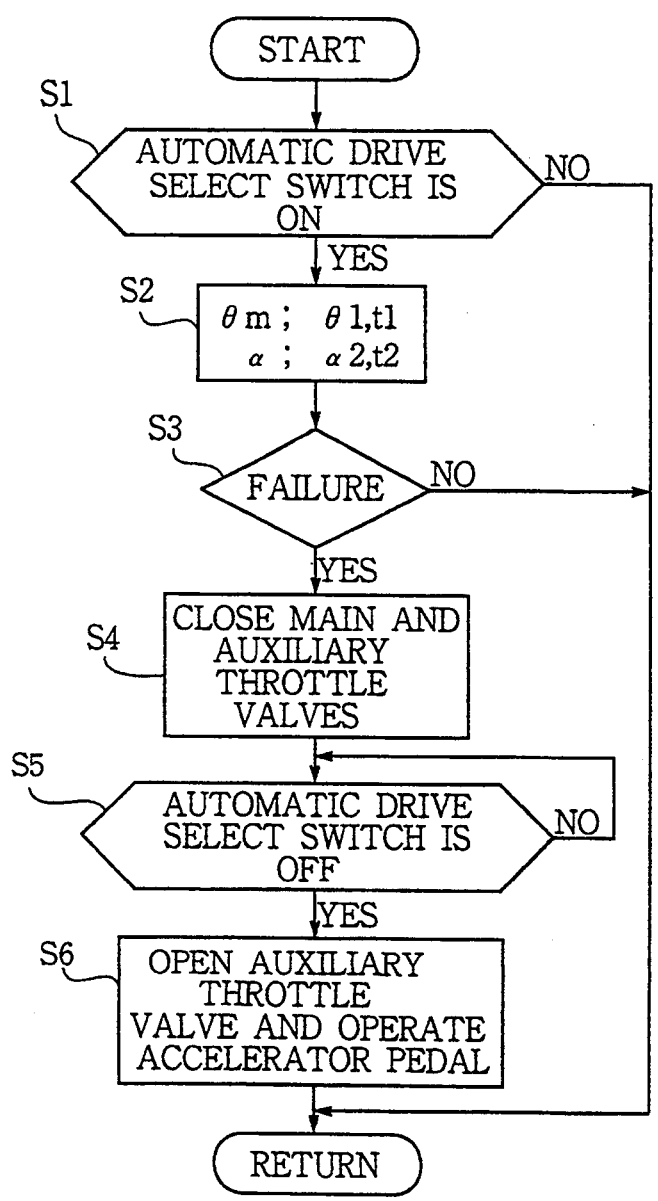
FIG. 4 is a flowchart describing the operation of the present invention.

During the operation of the automatic driving system, the fail-safe system is operated as shown in FIG. 4. At a step S1, it is determined that the automatic drive select switch 45 is turned on. At a step S2, the main throttle actual opening degree θm is compared with the predetermined reference degree θ1 and the magnitude $\alpha$ of acceleration is compared with the predetermined reference magnitude $\alpha_2$. A failure in the automatic driving system is accordingly determined at a step S3.

More particularly, when the motor 32 of the automatic driving system breaks down, the opening degree of the main throttle valve 7 stays the same in spite of the change in the desired throttle opening degree θmt, or the throttle valve 7 is moved only in the opening or the closing direction. If the throttle valve 7 becomes immovable at a small opening degree, or movable only in the closing direction, the resulting trouble is only that the power of the engine decreases. Thus, there is no danger of accidents happening caused by abrupt acceleration of the vehicle. However, if the throttle valve 7 maintains a large opening degree or the motor 32 cannot be operated to close the valve 7, the vehicle keeps on accelerating, entailing danger. Thus, the fail-safe system of the present invention detects these failures when the throttle opening degree θm exceeds the degree θ1 for more than the time t1.

On the other hand, if the main throttle position sensor 40 breaks down, the detected throttle opening degree θm detected by the sensor 40 becomes unreliable. Thus the throttle valve 7 cannot be accurately controlled to comply with the desired throttle opening degree θmt. Namely, although the throttle valve 7 is actually largely opened, a small opening degree θm may be detected. As a result, the magnitude $\alpha$ of the acceleration calculated by the acceleration calculator 63 increases. When the magnitude $\alpha$ exceeds the predetermined magnitude $\alpha_2$ for the time t2, the failure is determined at the determining section 62.

Thus, when the opening degree θm exceeds the reference degree and/or the magnitude $\alpha$ of acceleration exceeds the reference magnitude $\theta_2$, the program goes from the step S3 to a step S4.

At the step S4, the current fed to the motor 32 is cut off, and a closing current is fed to the motor 12, thereby immediately closing the main throttle valve 7 and the auxiliary throttle valve 8. As a result, the power of the engine, and hence the vehicle speed are decreased, thereby enabling to safely control the vehicle. Since the failure is detected by a multiple of means, safe driving is ensured.

The driver, detecting the decrease of the engine power, perceives right away that there is a failure in the automatic driving system and turns off the automatic drive select switch 45. The failure may be indicated on a display to warn the driver. The program hence proceeds from a step S5 to a step S6 where the current applied to the motor 12 is cut off to open the auxiliary throttle valve 8. At the same time the driver depresses the accelerator pedal to control the main throttle valve 7. Hence the vehicle is appropriately manually driven.

The second embodiment of the present invention is provided with means for detecting failures in the automatic driving system and the traction control system. The auxiliary throttle valve 8 of the second embodiment is adapted to close when the motor 12 stops.

Figure 5:
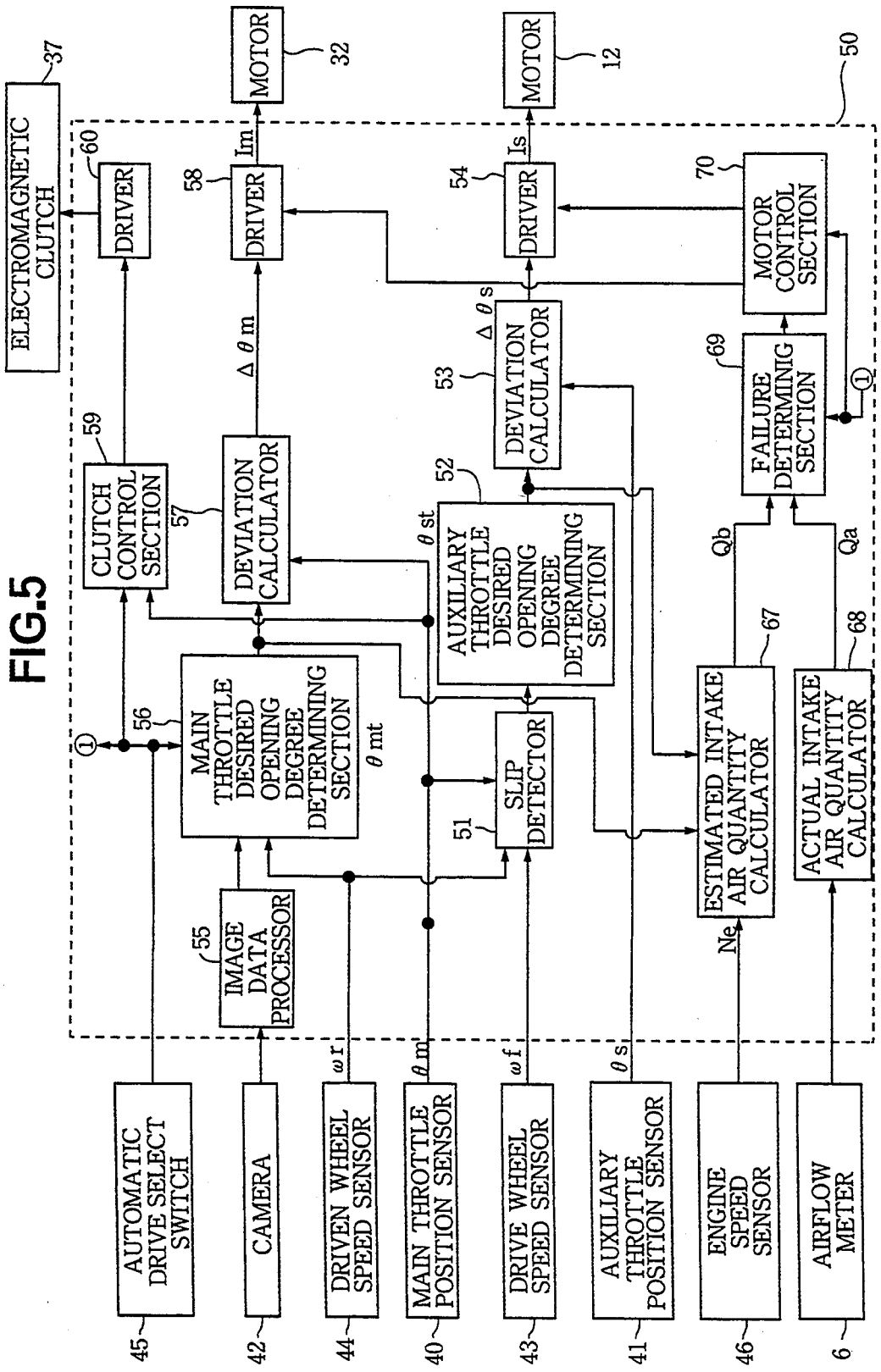
FIG. 5 is a block diagram of the control unit of a second embodiment of the present invention.

Referring to FIG. 5, the fail-safe system of the second embodiment has an engine speed sensor 46 for detecting an engine speed Ne of the engine 1 and a hot-wire airflow meter 6 mounted on the intake pipe 4 as shown in FIG. 1 for detecting an intake air quantity Qa. The engine speed Ne, desired throttle opening degree θmt from the main throttle desired opening degree determining section 56 and the auxiliary throttle desired opening degree θst from the auxiliary desired throttle opening degree determining section 52 are applied to an estimated intake air quantity calculator 67 which calculates an estimated intake quantity Qb. An actual intake air quantity determining section 68 determines the actual intake air quantity Qa in accordance with the output signal of the airflow meter 6. The estimated intake air quantity Qb and the actual intake air quantity Qa are applied to a failure determining section 69 which compares the quantities Qa and Qb when the ON signal is fed thereto from the automatic drive select switch 45. When the absolute value of the difference between the intake air quantities Qa and Qb is larger than a predetermined reference value k ($|Qa-Qb|>k$), the failure determining section 69 determines that there is a failure in the automatic driving system or the traction control system. The failure signal is fed to the motor control section 70 which accordingly applies a current cut off signals to the drivers 58 and 54. Hence the main throttle valve 7 and the auxiliary throttle valve 8 are closed as in the first embodiment of the present invention.

Figure 6:
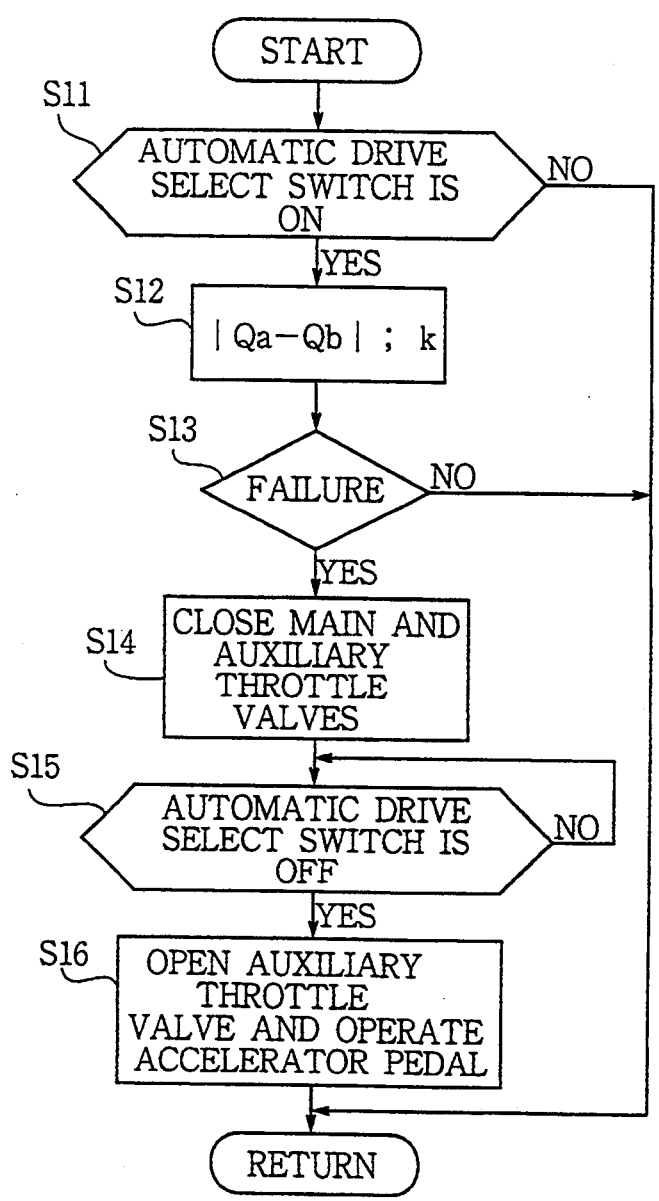
FIG. 6 is the flowchart describing the operation of the second embodiment.

Referring to FIG. 6, which describes the operation of the second embodiment, it is determined at a step S11 that the automatic drive select switch 45 is turned on. At a step S12, the absolute value of the difference between the actual intake air quantity Qa and the estimated intake air quantity Qb is compared with the reference value k.

When each of the devices for controlling the main and auxiliary throttle valves 7 and 8 accurately operate, the throttle valves 7 and 8 are controlled to render the actual intake air quantity Qa to coincide with the estimated quantity Qb. In such a situation, the program return to the start of the program.

On the other hand, when either of the motors 32 and 12 for controlling the main throttle valve 7 and the auxiliary throttle valve 8, respectively, breaks down, the actual intake air quantity Qa largely deviates from the estimated intake air quantity Qb. The difference between the quantities exceeds the value k so that the failure is determined at a step S13. If one of the throttle position sensors 40 and 41 breaks down or displaced from the determined position, a correct opening degree of the corresponding throttle valve cannot be detected. Accordingly, the throttle valves 7 and 8 cannot be controlled to be opened at the respective desired throttle opening degrees $\theta$mt and $\theta$st. Consequently, the actual intake air quantity Qa deviates from the estimated quantity Qb so that the failure is detected at the step S13.

At a step S14, the currents fed to the motors 32 and 12 are both cut off so that the main and auxiliary throttle valves 7 and 8 are closed. When the driver detects the failure and turns off the automatic drive select switch 45 at a step 15, the manual driving is resumed at a step S16, provided the traction control system is operable. If there is a failure in the traction control system, the auxiliary throttle valve 8 is kept closed under the manual driving, in the case of which the vehicle is driven with a minimum power by an idling control system. The other constructions and operations of the second embodiment are the same as those of the first.

In accordance with the second embodiment of the present invention, failures which occur in the traction control system is detected as well as the failures in the automatic driving system, so that the safety of the vehicle is further ensured. Moreover, since the fail-safe system detects the intake air quantity which is dependent on the operation of the entire throttle device, failure caused by displacement of the sensor from a given position can also be detected.

From the foregoing it will be understood that the present invention provides a fail-safe system wherein failures in the automatic driving system which may result in accidents are accurately detected. Thus, the automatic driving system is rendered inoperative at the failure, thereby eliminating danger.

While the presently preferred embodiments of the present invention have been shown and described, it is to be understood that these disclosures are for the purpose of illustration and that various changes and modifications may be made without departing from the scope of the invention as set forth in the appended claims.

What is claimed is:

1. A fail-safe system of an automatic driving system for a motor vehicle having a main actuator for operating a main throttle valve, an auxiliary actuator for operating an auxiliary throttle valve, a camera for detecting running conditions of a front-running vehicle and for generating a running condition signal, sensors for detecting driving conditions of a present motor vehicle and for producing a driving condition signal, an automatic drive select switch for producing an automatic drive signal when operated, first control means responsive to said automatic drive signal and said driving condition signal for operating said main actuator, and second control means responsive to said automatic drive and driving condition signals for operating said auxiliary actuator, the fail-safe system further comprising:

determining means responsive to the automatic drive signal and the driving condition signal for determining a failure of the automatic driving system and for producing failure signal; and actuator control means responsive to said failure signal for operating said main and auxiliary actuators so as to close the main and auxiliary throttle valves when said failure occurs and then to resume a manual driving by opening said auxiliary throttle valve after said automatic drive select switch is turned off.

2. The system according to claim 1, wherein:
each of said main actuator and auxiliary actuator is a motor.

3. The system according to claim 1, wherein:
said sensors include wheel speed sensors, a main throttle position sensor, an engine speed sensor, and an airflow meter.

4. The system according to claim 3, wherein:
said determining means comprises first means for producing a first failure signal when a larger throttle opening degree detected by the main throttle position sensor than a predetermined value continues for a set time, and a second means for producing a second failure signal when magnitude of acceleration of the motor vehicle based on wheel speed detected by the wheel speed sensors exceeds a predetermined value for a set time.

5. The system according to claim 3, wherein:
said determining means comprises third means for producing a third failure signal when a difference between an actual intake air quantity detected by the air flow meter and an estimated intake air quantity estimated from wheel speeds detected by the wheel speed sensors and engine speed detected by the engine speed sensor exceeds a predetermined value.

* * * * *